US009903585B1

(12) United States Patent
Crowder et al.

(10) Patent No.: US 9,903,585 B1
(45) Date of Patent: Feb. 27, 2018

(54) CATALYTIC BURNER WITH UTILIZATION CHAMBER (71) Applicant: Precision Combustion, Inc., North Haven, CT (US)

(72) Inventors: Bruce Crowder, Hamden, CT (US); Subir Roychoudhury, Madison, CT (US); Richard Mastanduno, Milford, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 398 days.

(21) Appl. No.: 14/683,527

(22) Filed: Apr. 10, 2015

Related U.S. Application Data (60) Provisional application No. 61/979,152, filed on Apr. 14, 2014.

(51) Int. Cl.
*F23C 13/02* (2006.01)
*F23C 13/08* (2006.01)
*F02G 1/055* (2006.01)
*F23R 3/40* (2006.01)

(52) U.S. Cl.
CPC .............. *F23C 13/02* (2013.01); *F02G 1/055* (2013.01); *F23R 3/40* (2013.01)

(58) Field of Classification Search
CPC .......... F23C 13/02; F23C 13/08; F02G 1/055; F23R 3/40
See application file for complete search history.

(56) References Cited

U.S. PATENT DOCUMENTS

| 2,616,672 | A | * | 11/1952 | Lambeek | ................ | F02G 1/055 |
|---|---|---|---|---|---|---|
| | | | | | | 165/169 |
| 2,765,621 | A | | 10/1956 | Poulston | | |
| 3,397,533 | A | * | 8/1968 | Steiner | .................... | F02D 41/30 |
| | | | | | | 60/521 |
| 3,760,592 | A | * | 9/1973 | Neelen | .................... | F02G 1/055 |
| | | | | | | 122/510 |
| 3,848,412 | A | * | 11/1974 | Michels | .................. | F02G 1/055 |
| | | | | | | 431/10 |

(Continued)

FOREIGN PATENT DOCUMENTS

| EP | 0015162 B1 | 8/1983 |
|---|---|---|
| WO | WO2004060546 A2 | 7/2004 |

(Continued)

*Primary Examiner* — Phutthiwat Wongwian
*Assistant Examiner* — Jessica Kebea
(74) *Attorney, Agent, or Firm* — Marie F. Zuckerman; Andrew D. Gathy (57) ABSTRACT A catalytic burner comprising a burner chamber and a utilization chamber, the burner chamber functionally divided into a fuel-oxidant mixing zone and a catalytic combustion zone. The burner chamber occupies a space disposed between outer and inner tubular walls of the burner. The utilization chamber, which is a space bounded by the inner tubular wall, remains hollow for secondary useful purposes, for example, connection to a heat sink of a Stirling engine and/or incorporation of a second heat source (e.g., solar or geothermal heat source). Auxiliary system components can also be packaged into the utilization chamber. The burner can function in hybrid flame and/or flameless modes, and can further include a recuperator to capture heat bypassing the heat sink.

20 Claims, 4 Drawing Sheets

(56) References Cited

U.S. PATENT DOCUMENTS

| | | | |
|---|---|---|---|
| 4,977,742 A * | 12/1990 | Meijer | F02G 1/044 |
| | | | 60/517 |
| 5,051,241 A | 9/1991 | Pfefferle | |
| 5,085,577 A | 2/1992 | Muller | |
| 5,590,526 A * | 1/1997 | Cho | F02G 1/043 |
| | | | 60/517 |
| 5,918,463 A * | 7/1999 | Penswick | F02G 1/055 |
| | | | 60/517 |
| 6,065,957 A * | 5/2000 | Kondo | F23C 9/00 |
| | | | 431/116 |
| 6,105,360 A * | 8/2000 | Willis | F23R 3/40 |
| | | | 60/723 |
| 6,156,444 A | 12/2000 | Smith | |
| 6,746,657 B2 | 6/2004 | Castaldi | |
| 7,913,484 B2 | 3/2011 | Roychoudhury | |
| 8,105,075 B2 | 1/2012 | Huau | |
| 8,387,380 B2 | 3/2013 | Roychoudhury | |
| 8,479,508 B2 | 7/2013 | Roychoudhury | |
| 2009/0113889 A1 | 5/2009 | Roychoudhury | |
| 2011/0165300 A1 | 7/2011 | Roychoudhury | |
| 2013/0266903 A1 | 10/2013 | Mastanduno | |
| 2013/0269676 A1 | 10/2013 | Quintaba' | |

FOREIGN PATENT DOCUMENTS

| | | | | |
|---|---|---|---|---|
| WO | WO 2010062131 A2 * | 6/2010 | | F01K 25/00 |
| WO | WO2102016873 A1 | 2/2012 | | |
| WO | WO2012106048 A1 | 8/2012 | | |

\* cited by examiner

CATALYTIC BURNER WITH UTILIZATION CHAMBER

CROSS-REFERENCE TO RELATED APPLICATION

The present application claims the benefit of U.S. provisional patent application No. 61/979,152, filed Apr. 14, 2014, the contents of which are incorporated herein by reference.

GOVERNMENT RIGHTS

This invention was made with support from the U.S. government under Contract No. N00014-12-D-0186/DO 0001. The U.S. government holds certain rights in this invention.

FIELD OF THE INVENTION

In one aspect, this invention pertains to a catalytic burner capable of providing heat to a thermally conductive heat sink, for example, a heat acceptor of a Stirling engine. In another aspect, this invention pertains to a Stirling engine comprising among its constituent parts the catalytic burner. In yet another aspect, this invention pertains to a combustion process employing the catalytic burner.

BACKGROUND OF THE INVENTION

Catalytic burners are known for generating and transferring heat to a thermally conductive heat sink, such as the heater acceptor of a Stirling engine. For the purposes of this invention, the terms "burner" and "combustor" are used interchangeably and are meant to imply an apparatus that under operable conditions achieves full combustion of a fuel with an oxidant primarily to form deep oxidation products, namely, carbon dioxide and water. Catalytic burners operate by contacting the fuel with the oxidant in the presence of a combustion catalyst capable of facilitating conversion of the fuel to carbon dioxide and water. As generally understood, the "catalyst" is a material or chemical composition that facilitates the combustion essentially without being consumed in the combustion. Catalytic combustion tends to be flameless. Catalytic burners start up in flame mode using an ignition device. Upon reaching a temperature sufficient for self-sustaining combustion ("light-off"), the ignition device is typically de-energized. The flame is then extinguished and catalytic combustion continues flamelessly.

Certain combustors, such as those described in application publication no. US 2013/0266903, corresponding to PCT application publication WO 2012/106048, may be operated in flame mode, or operated in catalytic flameless mode, or operated simultaneously in both flame and flameless modes, as desired. Such dual functional combustors are referenced herein as "hybrid burners." As disclosed in US 2013/0266903, a single fuel inlet and a single oxidant inlet are aligned around a longitudinal axis of the burner so as to deliver a fuel-oxidant reaction mixture into the combustion chamber. The combustion reaction is ignited in flame mode with resultant heat of reaction, which heats a catalyst positioned downstream of the fuel and oxidant inlets. At an appropriate temperature, the catalyst lights-off resulting in catalytic combustion. Heat of reaction is transmitted along the longitudinal axis into a heat sink. The hybrid burner may continue in simultaneous flame and flameless modes; or alternatively, the flame can be extinguished for operation solely in catalytic flameless mode.

The prior art, for example U.S. Pat. No. 8,479,508, discloses another catalytic combustor comprising a combustion chamber, one fuel inlet, one or two oxidant inlets, a combustion catalyst positioned within the combustion chamber, a heat acceptor surface positioned downstream of the catalyst, a heat spreader positioned in between and in direct contact with the combustion catalyst and the heat acceptor surface, and an outlet for exhausting combustion gases. The catalyst is taught to be constructed from an ultra-short-channel-length substrate, preferably a metal mesh having one or more noble metals deposited thereon. The fuel and oxidant inlets are positioned along a central longitudinal axis; while the combustion catalyst, heat spreader, and heat acceptor surface are layered and located downstream of the inlets in a radial plane within the combustion chamber. Heat is transferred in a longitudinal direction down the burner.

U.S. Pat. No. 8,387,380 discloses another flameless catalytic burner comprising a combustion chamber, one fuel inlet, one oxidant inlet, a combustion catalyst positioned within the chamber directly contacting a heat acceptor, and an outlet for exhausting combustion gases. Fuel and oxidant inlets are positioned along a central longitudinal axis; while the combustion catalyst is wrapped in a ring shape around a cylindrical heat sink. Combustion gases flow in and out of the burner in a longitudinal direction; while heat transfer is directed radially from the catalyst into the heat sink.

Notably, the catalytic combustors disclosed in the prior art use the interior volume of the combustor upstream of the catalyst to introduce and mix the fuel and oxidant. Introduction of fuel and oxidant occur near the center longitudinal axis of the combustor. The fuel and oxidant will mix and expand in a cone-shaped volume; and then flow longitudinally through the catalyst, which is positioned in a flat radial plane as in U.S. Pat. No. 8,479,508, or in a ring shape as in U.S. Pat. No. 8,387,380. An amount of interior volume outside the edges of the cone-shaped region is unused "dead space". For smaller burner designs (100-500 Watts thermal input), the unused dead space comprises an inconsequential portion of the burner volume and is typically not practically useful for other purposes. For larger burners (>500 Watts thermal input), the unused dead space is wasted.

We have recognized a need for a catalytic combustor that substantially eliminates wasted or "dead space" and that, preferably, renders useful essentially all of the volume within the space enveloped by the combustor. It would be desirable to design the catalytic combustor such that it could accommodate secondary utility components without sacrificing combustion efficiency. As examples, we have recognized that it would be desirable to design a catalytic combustor that could accommodate within the "dead space" a Stirling engine, or an auxiliary system component, such as a water coil or a heat recuperator, or another source of heat, such as a source of solar or geothermal heat.

SUMMARY OF THE INVENTION

This invention provides for a catalytic burner comprising:
(a) a housing comprising an inner tube disposed within an outer tube; wherein a volume in the region enclosed in between the inner and outer tubes defines a burner chamber, and a volume enclosed within the inner tube defines a utilization chamber;

(b) a cover plate secured to the housing at an inlet side of the burner, the cover plate sealing the burner chamber at said inlet side of the burner;

(c) a plurality of fuel injectors passing sealingly through the cover plate and terminating in a mixing zone within the burner chamber;

(d) a plurality of oxidant inlets passing through the cover plate and terminating in the mixing zone within the burner chamber;

(e) the mixing zone of the burner chamber positioned in fluid communication with the fuel injectors and oxidant inlets;

(f) optionally, at least one ignition device positioned within the mixing zone, each ignition device positioned at a terminus of one of the fuel injectors;

(g) a combustion catalyst positioned within the burner chamber, downstream and in fluid communication with the mixing zone; and (h) an exhaust outlet positioned downstream and in fluid communication with the combustion catalyst.

In one significant aspect, the catalytic burner of this invention positions burner components, namely, the fuel injectors, the oxidant inlets, the burner compartment, the combustion catalyst, and the exhaust outlet, within a spatial volume in between the inner and outer tubes that define a periphery of the combustion burner. In contrast, a central volume enclosed within the inner tube of the combustion burner provides a hollow (i.e., empty) chamber for advantageous utilization for secondary purposes. It is intended that at least a portion of the utilization chamber will be occupied by a thermally conductive heat sink, such as the heat acceptor of a Stirling engine, so as to capture heat of combustion for useful purposes, such as conversion to electricity. It is further intended that the remaining portion of the utilization chamber unoccupied by the heat sink might be engaged for other useful purposes. The chamber, for example, can be used to house additional energy-producing components, such as an assembly providing solar or geothermal heat, or used to house auxiliary system components, such as system control modules, a water coil, or a heat recuperator. In another embodiment, the burner may be thermally connected to an external Stirling engine through a heat sink positioned within the utilization chamber. In another embodiment, one Stirling engine can be positioned external to the burner, while a second Stirling engine can be positioned within the utilization chamber; and both Stirling engines can be thermally connected to the burner through a heat sink disposed within the utilization chamber. The apparatus of this invention advantageously avoids the "dead space" of conventional cylindrical burners wherein a single fuel inlet and one or two oxidant inlets are positioned near or on the central longitudinal axis of the burner.

In another aspect, this invention pertains to a combustion process wherein a fuel and an oxidant are contacted in the aforementioned catalytic burner, the contacting occurring in the presence of a combustion catalyst and under process conditions sufficient to produce a combustion product stream comprising carbon dioxide and water. The combustion process is particularly adaptable to processes wherein a fuel input of greater than 1,000 $W_{th}$ and less than 5,000 $W_{th}$ is employed.

DETAILED DESCRIPTION OF THE INVENTION

We have discovered and designed a catalytic burner based upon a burner compartment comprising the space in between an inner tube and an outer tube of a burner housing. The inner and outer tubes are not particularly limited by shape or dimension, so long as (a) the inner tube fits within the outer tube, and (b) components of the burner are positioned within the spatial volume between the inner and outer tubes. Necessarily, a continuous flow path is provided from an inlet end of the burner to an exit end of the burner. The burner housing, for example, may comprise inner and outer tubes that are both rectilinear and cylindrical, such that the tubes are positioned coaxially (i.e., overlapping longitudinal axes) or not coaxially (i.e., with a separate longitudinal axis for each tube). In another alternative, the burner housing may comprise oval-shaped inner and outer tubes, again positioned either coaxially or with separate longitudinal axes. In yet another embodiment, the burner housing may comprise two coaxial tubes of increasing diameter from inlet end to outlet end, that is, two concentric cone-shaped tubes. In yet another embodiment, the burner housing may comprise an inner tube and an outer tube, each having a square, rectangular, or diamond cross-sectional shape. In yet another alternative, the inner tube and the outer tube may each have the same or a different curvilinear shape, provided that a continuous flow path exists from inlets to outlet in the volume in between the two tubes.

The burner of this invention can be operated as a "hybrid burner" in either flame or flameless mode or simultaneously in both flame and flameless modes, as desired. In the apparatus of this invention, an ignition device, such as a glow plug or spark plug, may be employed to ignite the fuel upstream of the catalyst (for system warm-up) and may be used to assist fuel vaporization; however, an ignition device is not required. Other means of system warm-up are possible as described hereinafter. Another preferred embodiment provides flow channels that direct the oxidant into a swirling pattern, which helps to distribute and mix the flows of fuel and oxidant. Another preferred embodiment directs the injected fuel towards and onto a thermally conductive screen to expand the surface area of the fuel and aid its vaporization prior to mixing and ignition. A recuperative heat exchanger (recuperator) is included in yet another of the preferred burner designs. The recuperator collects heat from the combustion process to pre-heat incoming oxidant.

Thus, in a preferred embodiment, this invention provides for a catalytic burner comprising:

(a) a housing comprising two rectilinear and coaxial cylindrical tubes such that an outer tube is circumferentially disposed about an inner tube; wherein a volume defined by an annular cross-section circumscribed by the inner and outer tubes defines a burner chamber and a volume defined by the space within the inner tube defines a utilization chamber;

(b) an annular-shaped cover plate secured to the housing at an inlet side of the burner, the cover plate sealing the burner chamber at said inlet side of the burner;

(c) a plurality of fuel injectors passing sealingly through the cover plate and terminating in a mixing zone in the burner chamber;

(d) a plurality of oxidant inlets passing through the cover plate and terminating in the mixing zone in the burner chamber;

(e) the mixing zone of the burner chamber in fluid communication with the fuel injectors and the oxidant inlets;

(f) optionally, at least one glow plug positioned within the mixing zone, each glow plug positioned at a terminus of one of the fuel injectors;

(g) an annular-shaped combustion catalyst positioned within the burner chamber downstream and in fluid communication with the mixing zone;

(h) an exhaust outlet positioned in fluid communication with the combustion catalyst.

In a preferred embodiment, the plurality of fuel injectors and the plurality of oxidant inlets are disposed substantially equidistant around the annular segment comprising the burner chamber. In a more preferred embodiment, the catalytic burner further comprises a plurality of thermally conductive screens, each one positioned at a terminus of one of the fuel injectors within the mixing region of the burner. The thermally conductive screens function to increase the surface area of the fuel, so as to aid in fuel vaporization and ignition.

At least a portion of the utilization chamber, comprising the interior volume enclosed by the inner tube, is provided in thermally conductive contact with a heat sink for capturing heat of combustion for useful applications. In a preferred embodiment, thermal contact is made directly via solid-to-solid contact between the heat sink and an inner wall of the inner tube. The heat sink may take a variety of forms, one example of which is a conventional heat acceptor of a Stirling engine. Thus, in one preferred embodiment, this invention pertains to a catalytic burner for use with an external combustion engine wherein the heat sink comprises a heat acceptor of a Stirling engine. The remaining portion of the utilization chamber is intended to be and preferably is adapted for any of a multiplicity of uses including, for example: incorporation of a Stirling engine, or incorporation of a secondary heat source, such as a solar or geothermal heat source, or incorporation of auxiliary system components, such as power and system control modules, a water coil, or a heat recuperator, any of which would otherwise consume undesirable additional exterior volume. Thus in another preferred embodiment, the heat sink may comprise a heat transfer module of one or more components designed to accept heat generated within the catalytic burner and any other heat source located within the utilization chamber for conversion to useful energy.

In view of the above, this invention also provides for an external combustion engine, particularly a Stirling engine, having a piston undergoing reciprocating linear motion within an expansion cylinder containing a working fluid, heated by conduction through a heater acceptor, wherein the improvement comprises employing a catalytic burner for generating and transferring heat via conduction to the heat acceptor, the catalytic burner comprising:

a) a housing comprising an inner tube disposed within an outer tube; wherein the volume in the region enclosed in between the inner and outer tubes defines a burner chamber, and the volume enclosed within the inner tube defines a utilization chamber;

(b) a cover plate secured to the housing at an inlet side of the burner, the cover plate sealing the burner chamber at said inlet side of the burner;

(c) a plurality of fuel injectors passing sealingly through the cover plate and terminating in a mixing zone within the burner chamber;

(d) a plurality of oxidant inlets passing through the cover plate and terminating in the mixing zone within the burner chamber;

(e) the mixing zone of the burner chamber positioned in fluid communication with the fuel injectors and oxidant inlets;

(f) optionally, at least one ignition device positioned within the mixing zone, each ignition device positioned at a terminus of one of the fuel injectors;

(g) a combustion catalyst positioned within the burner chamber, downstream and in fluid communication with the mixing zone; and (h) an exhaust outlet positioned in fluid communication with the combustion catalyst.

Figure 1:
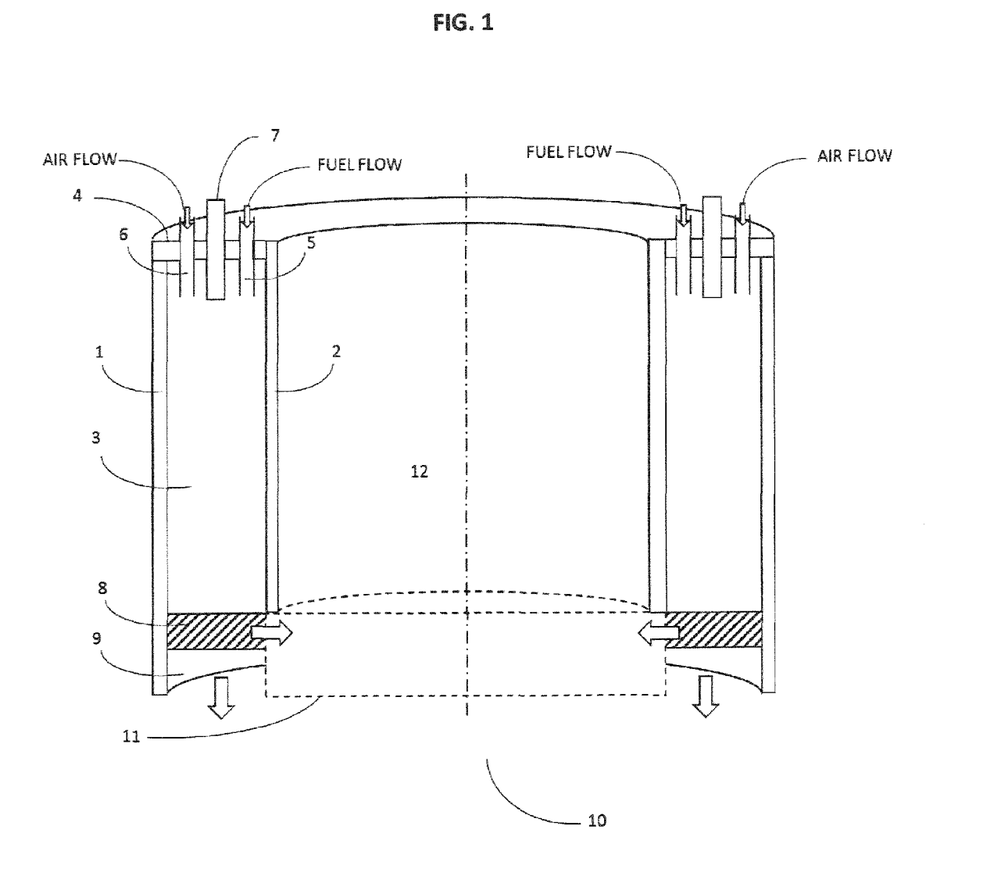
FIG. 1 depicts a longitudinal cross-section of an embodiment of the catalytic burner of this invention.

With reference to FIG. 1, an embodiment of the apparatus of this invention is shown in longitudinal cross-section as catalytic burner 10 comprising a housing composed of two rectilinear and coaxial tubes, an outer tube 1 and in inner tube 2. The outer tube 1 is positioned circumferentially around and coaxially with the inner tube 2. The ring-shaped annular segment 3 enclosed in between the outer tube 1 and inner tube 2 is functionally divided into a mixing region in the upper volume and a reaction region at the catalyst in the lower volume. Volume 12 enclosed by the inner tube 2 along the length of the burner is hollow, that is, empty space and is to be used for secondary purposes, including placement of a heat sink, e.g., a Stirling heat acceptor, or other system components as desired. An annular-shaped cover plate 4 is secured at the inlet end of the burner, so as to seal the annular area between the outer tube 1 and the inner tube 2 at said inlet end. At least two fuel injectors, one illustrated as fuel injection tube 5, pass sealingly through the cover plate and deliver fuel into the mixing region. At least two oxidant inlets, one illustrated as oxidant (e.g., air) inlet 6, are provided at the inlet end of the burner for feeding the oxidant into the mixing region. In this embodiment at least one ignition device 7 is provided; as illustrated each ignition device 7 is positioned to terminate within the mixing region at a location near the terminus of one of the fuel injectors 5. For clarity of illustration, FIG. 1 depicts only two fuel injectors, two oxidant inlets, and two ignition devices; however, the apparatus is not so limited and may contain any number of fuel injectors, oxidant inlets, and ignition devices as may be consistent with the scale of the annular segment of the apparatus. The fuel inlets, oxidant inlets, and ignition devices are disposed around the annular segment so as to distribute the fuel and oxidant in a balanced manner into the annular-shaped combustor. A combustion catalyst 8, provided in an annular shape to conform to the combustor design, is positioned downstream of and in fluid communication with the mixing region. Finally, an exhaust outlet 9 is positioned downstream of and in fluid communication with the combustion catalyst 8 for exhausting combustion products from the burner. FIG. 1 suggests the presence of heat sink 11, which is not an integral component of the claimed catalytic burner, but is shown in dotted lines for illustrative purposes. Heat sink 11 is disposed within the utilization chamber 12, and is connected to the burner by direct or indirect contact to catalyst 8, such that heat of reaction is transferred radially inward from catalyst 8 and heated reaction stream to the heat sink 11.

Figure 2:
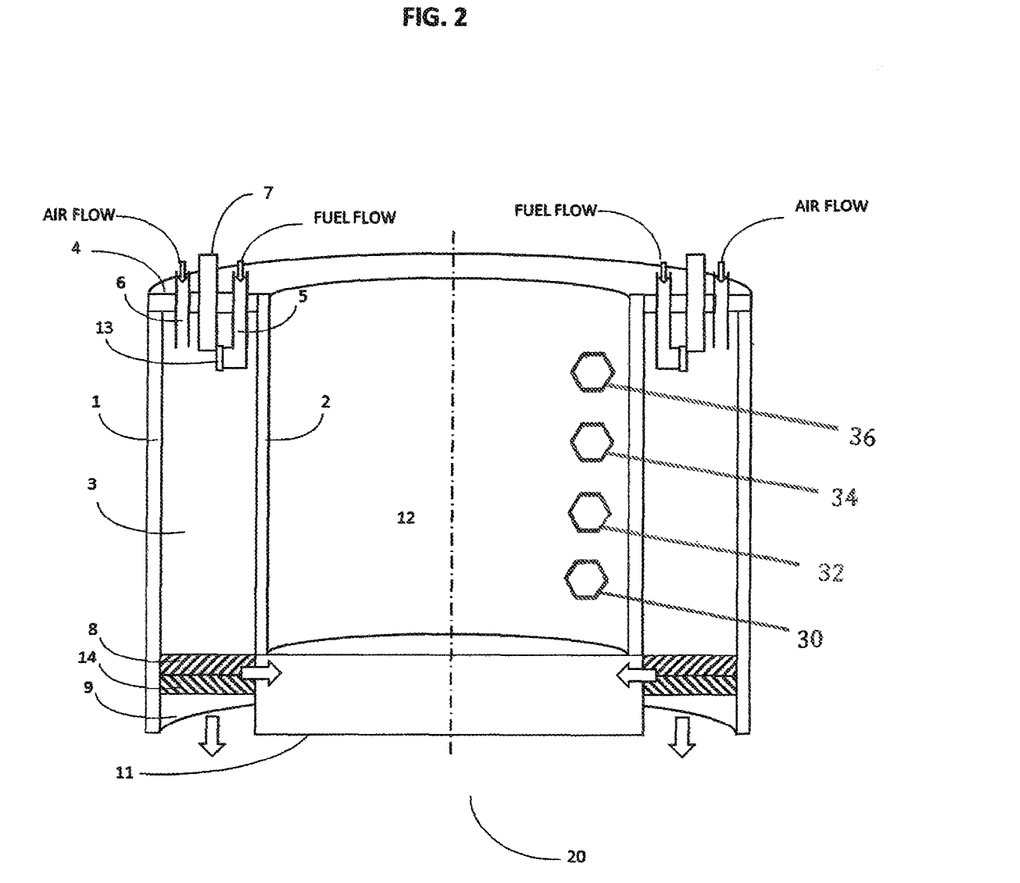
FIG. 2 depicts a longitudinal cross-section of a preferred embodiment of the catalytic burner of this invention.

Reference is made to FIG. 2 illustrating a preferred embodiment 20 of the catalytic burner of this invention. Components of FIG. 2 that are similar to those shown in FIG. 1 are called out with the same Arabic numerals. A housing is provided comprising two rectilinear and coaxial tubes, an outer tube 1 and in inner tube 2. The outer tube 1 is disposed circumferentially around and coaxially with the inner tube 2. The annular segment 3, enclosed in between the outer and inner tubes, is divided functionally into the mixing region in the upper volume and the catalytic combustion zone at the catalyst in the lower volume. Volume 12 enclosed by the inner tube 2 along the length of the burner is hollow, that is, empty space and is used for placement of a heat sink and secondary system components or a secondary heat source 30, such as a solar or geothermal heat source 32, or incorporation of auxiliary system components 34, such as power and system control modules, a water coil, or a heat recuperator 36. An annular-shaped cover plate 4 is secured, for example via welding, at the inlet end of the burner, so as to seal the annular segment between the outer tube 1 and the inner tube 2 at said inlet end. At least two fuel injectors, one illustrated injector 5, pass sealingly through the cover plate and deliver fuel into the mixing region. At least one reticulated metal screen 13 (or plurality of such screens 13), is positioned at the terminus of each fuel injector 5. At least two oxidant inlets, each one as illustrated in 6, is provided at the inlet end of the burner for feeding the oxidant into the mixing region. An ignition device 7 is provided and positioned within the mixing region at a location near the terminus of each fuel injector 5 and each thermally conductive screen 13. For clarity of illustration, in FIG. 2 only two injectors, two oxidant inlets, two sets of thermally conductive screens, and two ignition devices are shown; however, the apparatus is not so limited and may contain any number of fuel injectors, oxidant inlets, thermally conductive screens, and ignition devices as may be consistent with the scale of the annular segment 3. A combustion catalyst 8, provided in an annular shape so as to accommodate the annular shape of the combustion chamber, is positioned downstream of and in fluid communication with the mixing region within the burner compartment. A heat spreader 14 is positioned downstream and in fluid communication with the combustion catalyst 8. Finally, an exhaust outlet 9 for exhausting combustion products is positioned downstream of and in fluid communication with the heat spreader 14, which itself is downstream and in fluid communication with the combustion catalyst 8. FIG. 2 illustrates in solid lines a heat sink 11, which is not an integral component of the claimed catalytic burner 20, but in preferred applications is intended to be disposed within the utilization chamber 12 and secured to burner 20. Heat sink 11 is connected by direct or indirect contact to catalyst 8 and heat spreader 14, such that heat of reaction is transferred radially inward from catalyst 8 and heat spreader 14 as well as hot reaction stream in the vicinity into heat sink 11.

Figure 3:
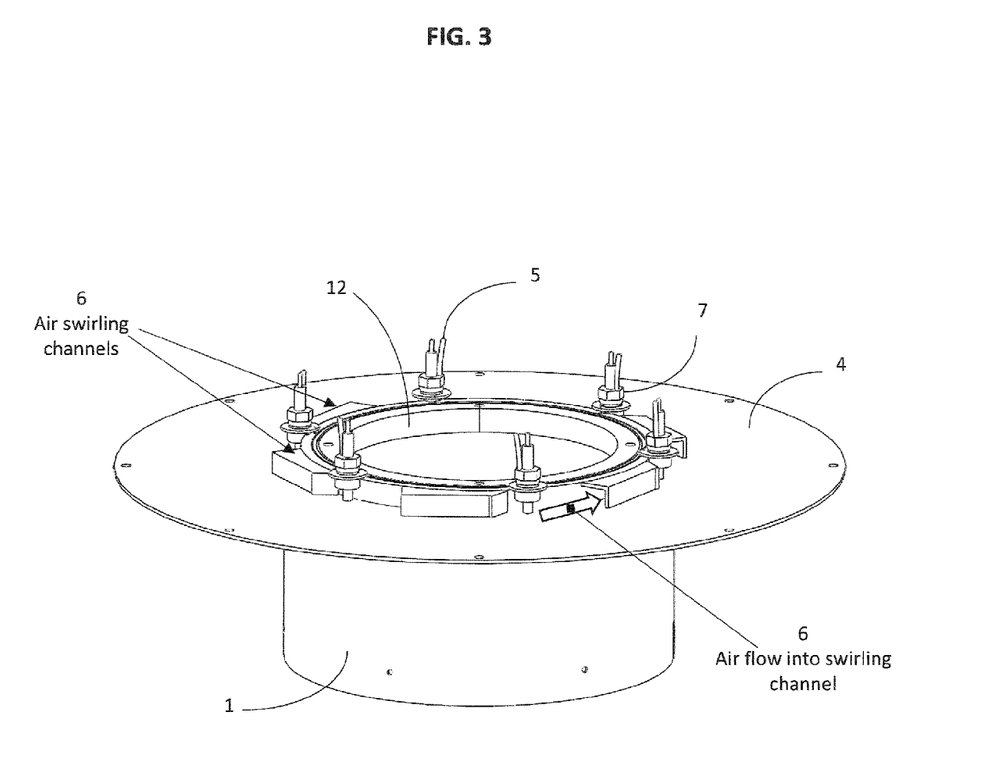
FIG. 3 depicts a side view of a preferred embodiment of the catalytic burner of this invention.

Reference is now made to FIG. 3, illustrating a side view of an embodiment of the burner apparatus of this invention. A top plate covering the apparatus parts is removed for clarity of illustration. The exterior wall of outer tube 1 of the combustion chamber is shown as a cylinder, to which the cover plate 4 is secured at the inlet end of the burner. In this embodiment, cover plate 4 is provided with a larger diameter than the diameter of the exterior wall of outer tube 1. Six ignition devices 7 are disposed equidistant around cover plate 4, passing sealingly through the cover plate 4 into the interior burner chamber. Proximate to the ignition devices 7 are shown six fuel injection tubes 5, also displaced equidistant around cover plate 4 and passing sealingly through plate 4 into the burner chamber. The plurality of fuel injectors may be manifolded and controlled as a group, or alternatively, individually valved and controlled. Six air flow channels 6 are displaced equidistant around cover plate 4 and positioned proximate to the fuel injection tubes 5 and ignition devices 7. In this embodiment, oxidant flow is introduced through flow channels and holes in cover plate 4 into an air plenum located just below cover plate 4 and upstream of the catalyst within the burner chamber. In this embodiment the air flow passages are designed to introduce a tangential swirl into the air flow. Interior volume 12, enclosed by the inner wall of the inner tube 2, may house not only a heat acceptor, but secondary system components such as such as a secondary source of heat, a Stirling engine, a water coil, or a heat recuperator.

The inner and outer tubes comprising the housing of the combustor can be constructed from any material capable of withstanding temperature, heat of reaction, and chemical environment to which the housing is exposed. Typically, the inner and outer tubes are constructed from stainless steel, nickel alloy, nickel-chromium alloy, or any other heat resistant alloy.

Each fuel injector comprises a fuel injection tube, or a pressure atomizer, or any other conventional fuel dispensing device or metering system known in the art. Each fuel injector passes sealingly through the cover plate and delivers a quantity of fuel into the mixing region of the burner. The words "passes sealingly through" mean that the fuel injectors pass through holes in the cover plate in a manner that seals the escape of gaseous materials from the combustion chamber; for example, the fuel injectors can be welded to the cover plate. The fuel injectors will be provided in a number that depends upon the diameter of the outer tube and the size of the annular cross-section between the inner and outer tubes. As the annulus increases in size, the number of fuel injectors can also increase. Preferably, the catalytic burner comprises at least 2 fuel injectors, more preferably, at least about 4 fuel injectors, most preferably, at least about 6 fuel injectors. Typically, the catalytic burner comprises not more than about 24 fuel injectors. Preferably, the fuel injectors are disposed equidistantly around the cover plate.

The fuel injectors are constructed from any material that can withstand temperature, heat of reaction, and chemical environment to which they are exposed. The outer surface of the fuel injectors generally comprises a heat resistant metal or metal alloy, such as those mentioned hereinbefore including stainless steel, nickel alloy, nickel-chromium alloy, or any other heat resistant alloy. The inner surface of the fuel injectors generally comprises a heat resistant metal or metal alloy identical to that provided on the outer surface of the fuel injectors. Alternatively, in order to reduce coking, the inner surface of the fuel injectors may comprise a thermal insulator or a passivated metal surface, such as may be provided by cobalt or silicon treated stainless steel.

Each fuel injector terminates in an orifice positioned proximate to an oxidant inlet, and more preferably, proximate to an oxidant inlet and a heat conductive reticulated screen, as illustrated in FIG. 2. With respect to the heat conductive screen, the words "proximate to" mean that the fuel injector orifice is positioned near the screen in such a manner as to allow the fuel to flow or drip or spurt onto the screen without unacceptable delivery or loss of fuel to any other surface of the apparatus. Proximate positioning may also include having the orifice of the fuel injector contact the screen. The fuel injector orifice is not so small as to clog easily, but not so large as to render the delivery of fuel unacceptably slow. Advantageously, each fuel injector orifice will have an inner diameter (I.D.) ranging from about 0.5 mm to about 5.0 mm, preferably, from about 0.5 mm to about 3.5 mm; but these ranges are only offered as guidelines. The skilled person may vary the size of the orifice as needed and as consistent with the scale of the apparatus.

The oxidant inlets are provided, in one embodiment, as flow paths through the cover plate discharging into an oxidant plenum in the upper portion of the burner chamber directly below the plate. In another embodiment, the oxidant inlets are provided as a collection of oxidant inlet tubes passing sealingly through the cover plate, each tube terminating in close proximity to the terminus of one of the fuel injectors. Here too, the words "passing sealing through" mean that the oxidant inlet tubes are connected to the cover plate to prohibit leakage of any gaseous component or gaseous reaction mixture from the combustion chamber, welding being a suitable example of such sealing. The actual terminus of the oxidant inlet tubes is not so critical, because the oxidant is gaseous and will fill any volume of space around the fuel injectors, the optional ignition device(s), and the optional reticulated screens. If tubes are employed, the oxidant inlets are constructed from a heat resistant material, such as stainless steel, nickel alloy, nickel-chromium alloy, or other alloy as appropriate. The flow of oxidant may be imparted with a swirl, preferably, a tangential swirl, by feeding the oxidant through flow channels, rippled structure, fins, or any other structure known in the art to provide swirl.

The number of oxidant inlets will depend upon the diameter of the outer tube and the annular area of the cover plate. The larger the diameter of the outer tube, the larger the number of oxidant inlets that can be accommodated. Generally, the catalytic burner comprises one oxidant inlet for each fuel injector present. Preferably, the catalytic burner comprises at least 2 oxidant inlets, more preferably, at least about 4 oxidant inlets, most preferably, at least about 6 oxidant inlets. Typically, the number of oxidant inlets is not greater than 24. Preferably, the oxidant inlets are displaced equidistantly around the cover plate.

In a preferred embodiment, a heat conductive reticulated screen is positioned in the mixing region of the burner in proximity to the terminus or directly contacting the terminus of each fuel inlet tube. The function of the heat conductive reticulated screen is to increase the surface area of the fuel and aid in fuel vaporization and ignition. Each heat-conductive reticulated screen may be provided as only one screen or, more preferably, as a plurality of stacked screens. The term "heat-conductive" means that the screen is capable of transferring heat from a point of entry to other points throughout the screen. Metals typically are heat-conductive; therefore, the reticulated screen preferably comprises a metal or metal alloy sufficiently durable to withstand heat of reaction. More preferably, the heat conductive reticulated screen is selected from stainless steel, nickel-steel alloy, nickel-chromium alloy (for example, Inconel® nickel-chromium), or any other heat resistant alloy. A preferred heat conductive reticulated screen is the expanded metal reticulated screen disclosed in U.S. Pat. No. 6,156,444, incorporated herein by reference.

The heat conductive reticulated screen comprises a net-like structure composed of an array of metallic wires, or metallic threads, or metallic fibers in between which exist a plurality of openings or void spaces. The screen can be fabricated as a monolithic metal net or mesh or fabricated from a plurality of metal elements woven or brazed together. The diameter of the threads, fibers, or wires advantageously ranges from about 0.0005 inch (12.7 µm) to about 0.02 inch (508 µm). The openings or void spaces between the threads, fibers, or wires may take any shape including, for example, square, rectangular, circular, elliptical, diamond, or hexagonal, and any suitable size, preferably, ranging from about 0.0007 inch to about 0.020 inch (17.8 µm to about 508 µm) in length, diameter, or longest dimension. The screen may be provided as a substantially flat surface or alternatively any other appropriate shape, for example, a circular band, a dome, a bowl, or a donut. As mentioned hereinbefore, a stack of screens is preferably employed at each screen location, the stack ranging from 2 to about 20 screens. The reticulated or net-like structure functions to break-up the liquid fuel into smaller droplets and disperse the droplets over the surface of the screen to facilitate vaporization and ignition. Heat-conductive reticulated screens are commercially available from McMaster-Carr, Robinsville, N.J.

Optionally, the heat-conductive reticulated screen can be coated with one or more oxidation catalysts, suitable examples of which include without limitation Group VIII metals of the Periodic Table, silver and gold, more preferably, the noble metals, these specifically comprising ruthenium, rhodium, palladium, osmium, iridium, platinum, silver, gold, and mixtures thereof. Methods for depositing metals onto reticulated screens or metal fibers are known and available in the art of catalysis.

Optionally, at least one ignition device is provided in the burner chamber. The word "optionally" means that the relevant element may or may not be employed, as desired. Accordingly, in one embodiment no ignition device is provided. In such an embodiment, the oxidant can be externally preheated and fed to the burner at a temperature sufficient to "light off" the catalyst. If the oxidant is not preheated, the catalyst may be lit off by a source of heat provided through the utilization chamber, such as source of solar or geothermal heat. In another embodiment, at least one ignition device is provided, its function being to ignite the incoming mixture of fuel and oxidant with consequential heat of reaction so as to raise the temperature of the catalyst to its "light off temperature, after which the ignition device can be deenergized. When at least one ignition device is employed, the number of such devices ranges from 1 to any number equal to or less than the number of fuel injectors. For optimal efficiency, the number of ignition devices equals the number of fuel injectors, each ignition device being positioned at the terminus of a corresponding fuel injector. Accordingly, it is more preferred to employ 2 ignition devices, even more preferably, at least about 4 ignition devices, and most preferably, at least about 6 ignition devices; but the number is not limited and will depend upon the diameter of the outer tube of the burner. Typically, less than about 24 ignition devices are employed.

Suitable ignition devices for igniting the fuel and oxidant mixture include, without limitation, glow plugs and spark plugs. Preferably, the ignition device is a glow plug or plugs, as the case may be. Glow plugs can be obtained commercially, for example, from Bosch or NGK. Generally, each ignition device passes through the cover plate in sealing engagement at the inlet side of the burner. Sufficient heat should be input to the ignition device to raise the temperature of the incoming fuel to its ignition point, and thereafter, to continue heating the thermally conductive screen to assist vaporization of the fuel. (Alternatively, each thermally conductive screen can be resistively heated by connecting the screen to an electrical circuit.)

The combustion catalyst located in the reaction zone of the burner chamber is positioned downstream of and in fluid communication with the mixing region wherein the fuel injectors, the oxidant inlets, the optional ignition device(s), and the optional reticulated screens are disposed. Advantageously, the combustion catalyst comprises an ultra-short-channel-length metal substrate, preferably, an ultra-short-channel-length metal substrate having deposited thereon one or more noble metals selected from ruthenium, rhodium, palladium, osmium, iridium, platinum, silver, gold, and mixtures thereof. Most preferably, the noble metal comprises rhodium or a mixture of rhodium with one or more other noble metals. The ultra-short-channel-length metal substrate is preferably provided as a metal mesh or metal foam, but the invention is not limited to such structures; and other structures may be suitable. In a most preferred embodiment, the combustion catalyst comprises a Microlith® brand ultra-short-channel-length metal mesh substrate having deposited thereon one or more of the aforementioned noble metals, as obtained from Precision Combustion, Inc., North Haven, Conn.

Microlith® brand ultra-short-channel-length metal mesh substrate technology is a catalyst design concept comprising a series of ultra-short-channel-length, low thermal mass, metal monoliths that replace conventional prior art monoliths having longer channel lengths and larger mass. For the purposes of this invention, the term "ultra-short-channel-length" refers to channel lengths in a range from about 25 microns (μm) (0.001 inch) to about 500 microns μm (0.02 inch). In contrast, the term "long channels" pertaining to prior art monoliths or honeycombs refers to channel lengths greater than about 5 mm (0.20 inch).

The preferred Microlith® brand ultra-short-channel-length metal mesh substrate promotes packing more active surface area into a smaller volume and provides increased reactivity area for a given pressure drop, as compared to prior art monoliths. In conventional honeycomb monoliths having conventional long channels, a fully developed boundary layer is present over a considerable length of the channels. In contrast, the ultra-short-channel-lengths, characteristic of the Microlith® brand substrate, avoid boundary layer buildup. Since heat and mass transfer coefficients depend on boundary layer thickness, avoiding boundary layer buildup enhances transport properties. The advantages of employing the ultra-short-channel-length metal substrate, and preferably, the Microlith® brand ultra-short-channel-length metal mesh substrate, to control and limit the development of a boundary layer of a fluid passing therethrough is described in U.S. Pat. No. 7,504,047, which is a Continuation-In-Part of U.S. Pat. No. 6,746,657 to Castaldi, the contents of both patents being incorporated herein by reference. The Microlith® brand ultra-short-channel-length metal mesh substrate is also described in U.S. Pat. No. 5,051,241, and U.S. Pat. No. 6,156,444, both patents also incorporated herein by reference.

The catalyst is provided to fit into the spatial volume between the inner and outer tubes forming the combustor housing, and is preferably provided in the shape of the cross-sectional area between the inner and outer tubes. In a preferred embodiment where the inner and outer tubes are both cylinders having circular cross-section, the catalyst is provided as a ring or annulus. If the inner and outer tubes are oval shaped, the catalyst is provided as an oval-shaped disk. Any other catalyst shape that accommodates the region between the inner and outer tubes is permissible. In another preferred embodiment, the catalyst can be provided as a stack of ultra-short-channel-length metal meshes, the stack more preferably ranging from 2 to about 20 layers of metal mesh, the stack accommodating the relevant shape of the catalytic combustion region between the inner and outer tubes of the burner housing.

As another option, a flashback arrestor can be located downstream of the fuel injectors and upstream of the catalytic combustion region within the volume between the inner and outer tubes of the housing. The flashback arrestor can be any such conventional device including a constriction in the distance between the outer and inner tubes. A constriction imparts velocity in the flow direction thereby retarding undesirable flashback.

Preferably, a heat spreader is located downstream and in fluid communication with the combustion catalyst, while located upstream of and in fluid communication with the burner exhaust outlet. Preferably, the heat spreader is positioned in direct thermal contact with the combustion catalyst, the thermal contact predominantly solid-to-solid point-to-point conductive in nature. Like the catalyst, the heat spreader takes the shape of the cross-section of the combustor housing, i.e., the cross-sectional area of the region between the inner and outer tubes. In a preferred embodiment where the inner and outer tubes are both cylinders of circular cross-section, the heat spreader is provided as a ring or annulus or a stack of such rings or annuli. When the inner and outer tubes are oval shaped, the heat spreader is provided as an oval-shaped disk or stack of such disks. Any other heat spreader shape that accommodates the annular segment between the inner and outer tubes is permissible. Any number from 1 to about 20 layers of heat spreader may be present in the heat spreader stack.

Like other materials of construction mentioned hereinbefore, the heat spreader is constructed from any thermally conductive metal capable of withstanding combustion conditions. Suitable materials include, without limitation, stainless steel, steel and nickel alloys, and iron and chrome alloys, as well as other high temperature materials known in the art. In a preferred embodiment, the heat spreader is constructed from a stack of metallic sheets, each sheet having a thickness from about 25 μm (0.001 inch) to about 500 μm (0.020 inch). Each sheet is provided with a plurality of axial slits, running from the outer edge inward in a radial direction, so as to pass-through the gaseous combustion product stream.

Gaseous combustion products and heat of reaction produced in the catalytic reaction region exit downstream through the optional heat spreader and through the exhaust outlet and, optionally, through a recuperator detailed hereinafter. Heat flux derived from the hot combustion products, the heated combustion catalyst, and the optional heat spreader may be transferred substantially radially inwards towards a heat sink. The heat sink is not an integral part of the burner apparatus of this invention; but the burner is strategically designed to accommodate a heat sink in the hollow interior volume of the burner, the so-called "utilization chamber." Preferably, a heat sink is present and directly contacted to the inner tube for efficiency of thermal heat transfer. The heat sink may comprise a single conventional heat acceptor, e.g., of a Stirling engine, or alternatively may comprise a heat transfer module of one or more components designed to accept heat generated in the catalytic burner as well as any heat source located in the utilization chamber, for example, an assembly providing solar or geothermal heat.

It should be mentioned that the heat sink is also constructed from any thermally conductive material, such as a metal or alloy, suitable examples of which include copper, nickel, and alloys or blends of copper and nickel. Heat transferred to the heat sink can be converted into useful electrical or mechanical energy, as desired. The heat sink usually takes the shape of the hollow region, or a portion of the hollow region, bounded by the inner tubular wall (e.g., FIG. 1 (2)), and may or may not include fins, dimples, grooves, and/or other structures that facilitate heat distribution.

The catalytic burner and heat sink can be oriented with a longitudinal axis vertical to level ground, or a longitudinal axis horizontal (i.e., parallel) to level ground, or any angle in between vertical and horizontal.

The exhaust outlet from the catalytic burner comprises any conventional conduit or tube or passage positioned downstream of and in fluid communication with the combustion catalyst and optional heat spreader. The outlet functions to exhaust the combustion product stream and any heat of reaction bypassing the heat sink, typically, to an outside environment. Like the other conduits of this apparatus, the outlet may be constructed from stainless steel, a nickel alloy, a nickel-chromium alloy, or any other heat resistant alloy.

In a preferred embodiment of the invention, at least a portion of the outlet connects to a recuperator constructed from a heat-conductive wall dividing the exiting hot combustion gases from the incoming flow of oxidant. As such, at least a portion of the heat of reaction by-passing the heat sink and exiting the exhaust outlet can be captured via transfer across the recuperator wall to the incoming oxidant flow, thereby lowering the burden of external heat needed to raise the temperature of the oxidant. The recuperator is typically positioned adjacent to the burner in vertical or outboard sideways alignment. As a preferred embodiment, the recuperator is positioned coaxially and radially around the exterior of the outer tube of the combustor housing, examples of which include the recuperators illustrated in U.S. Pat. No. 7,913,484 and U.S. Pat. No. 8,387,380, incorporated herein by reference.

In another preferred embodiment of this invention, the burner operates in "hybrid" mode, that is, in using both flame and flameless options. The operation in hybrid modes proceeds as follows. The liquid fuel is delivered through the plurality of fuel injectors, optionally each injector depositing the fuel onto a corresponding heat-conductive reticulated screen. Each screen is heated via a corresponding glow plug to a temperature sufficient to produce vaporization of the fuel. The vaporized fuel is contacted with the incoming flow of oxidant, preferably air, delivered through the plurality of oxidant inlets into an oxidant plenum in the upper region of the burner compartment; and the heated mixture of fuel and oxidant is ignited in flame mode in the mixing region of the burner compartment generating combustion products and heat of reaction. The heat of reaction flows downstream towards the combustion catalyst, raising its temperature until at the point of "light-off" the catalytic combustion reaction starts up and becomes self-sustaining. At this point, combustion occurs simultaneously in flame and catalytic flameless modes and can be continued in this manner, if desired. Alternatively, the glow plugs can be de-energized. Then, the flame can be extinguished by manipulation of fuel and/or oxidant flows. Once the flame is extinguished, the reaction proceeds at steady state via flameless catalytic combustion. A heat spreader located in direct contact with the combustion catalyst facilitates the flow of heat throughout the reaction region of the burner. A portion of the heat of reaction in and around the catalyst and heat spreader is transferred radially inward to the heat sink, preferably, the heat acceptor of a Stirling engine, where the transferred heat may be advantageously converted into electrical energy. The balance of the heat of reaction by-passes the heat sink and exits the burner via the exhaust outlet, wherein at least a portion of the heat is preferably collected and recycled in a recuperator to pre-heat the incoming flow of oxidant.

The catalytic burner of this invention advantageously provides for catalytic combustion from cold start-up, meaning that the combustion catalyst and incoming flows of fuel and oxidant can be provided to the burner at ambient temperature with no required pre-heating of the fuel or oxidant flows by an external source of heat, other than a small quantity of heat needed to resistively heat the reticulated screens and/or the ignition devices. Keep in mind that heat captured by the recuperator is predominantly heat generated in-situ by the catalytic burner itself.

For purposes of operational aspects of the apparatus of this invention, the fuels used with this catalytic burner comprise any liquid or gaseous fuel. The term "liquid fuel" refers herein to any hydrocarbon fuel that, irrespective of viscosity, is available as a liquid at a temperature ranging from about −30° C. to about 55° C. and at a pressure ranging from about 0.5 atmosphere (atm) to about 1 atm (55 kPa to 101 kPa). Such fuels are complex mixtures of hydrocarbons, namely, organic compounds comprising carbon and hydrogen, such compounds to include aliphatic, cycloaliphatic, and aromatic hydrocarbons, and mixtures thereof as known in the art. Such individual hydrocarbon compounds typically have from 5 to about 70 carbon atoms and a boiling point equal to or greater than 90° C. but less than about 700° C. Distillate fuels are of preferred significance. As used herein, the term "distillate fuel" refers to any hydrocarbon fuel obtainable as a distillate fraction in refinery operations. The distillate fuel suitable for this invention typically has a boiling point greater than about 120° C., and preferably, less than about 600° C. Hydrocarbon compounds in distillate fuel mixtures typically have from about 10 to about 70 carbon atoms per hydrocarbon molecule, preferably, from about 10 to about 20 carbon atoms per hydrocarbon molecule. Gaseous fuels include any combustible compound or mixture of combustible compounds occurring in a gaseous state at ambient temperature taken as about 21° C., and ambient pressure, taken as 1 atm (101 kPa).

Liquid fuels suitable for use in the catalytic burner of this invention include, without limitation, gasoline, kerosene, diesel, and jet propulsion fuels, including for example, JP-8, JP-5, and JET A fuels. Preferred distillate fuels are selected from kerosene, diesel, and the jet propulsion fuels, particularly JP-8, and mixtures thereof. Preferred gaseous fuels include methane, propane, natural gas, synthesis gas (CO+ $H_2$), and mixtures thereof.

For the purposes of this invention, the term "oxidant" refers to any chemical compound or mixture of chemical compounds capable of reacting with the liquid fuel to produce full combustion products, mainly, carbon dioxide and water. Suitable oxidants include, without limitation, mixtures of oxygen and nitrogen, including air, essentially pure molecular oxygen, mixtures of oxygen and inert gases, such as helium, argon, xenon, as well as ozone, and nitrogen oxides. Preferred are mixtures of oxygen and nitrogen, most preferably, air.

The quantities of fuel and oxidant employed are best expressed as an equivalence ratio, defined herein as the molar ratio of fuel to oxidant actually fed to the reactor relative to the stoichiometric molar ratio of fuel to oxidant required for complete combustion to carbon dioxide and water. For burner applications, such as found in Stirling engines, the equivalence ratio is preferably maintained at less than 1:1. An equivalence ratio of 1:1 corresponds to the stoichiometric ratio needed for complete combustion of the fuel. An equivalence ratio of less than 1:1 corresponds to "fuel-lean" conditions. Typically, burners for Stirling engines are run "fuel-lean."

The fuel flow is adjusted according to the desired power output of the combustor. An exemplary range of achievable power output from the burner varies from greater than 500 Wth to about 10,000 Wth (10 kWth). As a specific illustration, for a 600 Watt electric power output (600 $W_e$), assuming a 20 percent efficiency conversion from heat to electric power, 3,000 Watts thermal (3,000 $W_{th}$) should be delivered in fuel input over the operating time. The flow rate then depends upon the specific fuel employed and its fuel value, as will be known to those skilled in the art. As an example, for JP-8 fuel, the flow rate to deliver 3,000 $W_{th}$ power is about 5.2 ml/min total distributed to the fuel injection tubes. Once the fuel flow rate is established, the oxidant flow rate is adjusted depending upon the desired operating equivalence ratio.

The catalytic combustor of this invention can be operated at any temperature consistent with materials of construction and the specific catalyst employed. Preferably, the combustor is operated at a temperature above the coking temperature of the selected fuel. The maximum temperature is chosen to facilitate durability of the reactor and catalyst. Generally, a temperature ranging from about 350° C. to about 1,150° C. is employed; preferably, from about 500° C. to about 950° C., and even more preferably, from about 600° C. to about 850° C. The pressure in the reactor can range from sub-atmospheric to super-atmospheric; but will typically be operated at or about atmospheric pressure.

For optimal efficiency of operation, it is beneficial to maintain an even temperature profile throughout the catalyst. An uneven temperature profile across the catalyst may be indicative of cold-spots and hot-spots, which lead to more rapid catalyst degradation and reduced combustion efficiency. Thus, it is beneficial to locate conventional thermocouples around the perimeter of the catalyst or in various locations within the catalyst to monitor catalyst temperature. Even with optimal design, the temperature of the catalyst may vary with location due to variations in thermocouple attachments to the catalyst, variations in fuel and oxidant flows, and inhomogeneities in the fuel-oxidant mixture. It is desirable to minimize temperature spread ($\Delta T$) on or within the catalyst, that is, the difference between highest and lowest temperature measurements, to no more than about 100° C. The temperature spread can be controlled by independently controlling the molar ratio of fuel to oxidant and/or the flows of fuel and oxidant fed to the burner at each fuel inlet-oxidant inlet pair.

Example

A catalytic burner was constructed according to the design illustrated in FIGS. 2 and 3. A housing was provided comprising an outer cylindrical tube 1 constructed from stainless steel and an inner cylindrical tube 2 constructed from Hastelloy® brand nickel-chromium alloy. The outer tube had an outer diameter of 8.00 inches (20.3 cm), a wall thickness of 0.06 inches (0.15 cm), and an inner diameter of 7.88 inches (20.0 cm). The inner tube had an outer diameter of 6.84 inches (17.4 cm), a wall thickness of 0.075 inches (0.19 cm), and an inner diameter of 6.69 inches (17.0 cm). The outer tube 1 was arranged coaxially with the inner tube 2. A cover plate 4 constructed from stainless steel was fashioned in the form of an annulus having an outer diameter of 15 inches (38.1 cm) and an inner diameter of 5.69 inches (14.5 cm). Six holes were drilled through the cover plate close to the inner tube for securing six fuel inlet tubes 5, the holes being disposed equidistantly around the cover plate. Six additional holes were drilled through the cover plate close to the outer tube for positioning six air inlets 6, these six holes also disposed equidistantly around the cover plate. Six additional holes, also disposed equidistantly, were drilled through the cover plate in between the fuel and air inlet holes for positioning six ignition devices (glow plugs) 7. The cover plate was sealingly welded to the inner and outer tubes. The annular region in between the outer and inner tubes comprised the combustion chamber, the upper volume functioning as the mixing zone and the lower volume functioning as the combustion reaction zone. The hollow inner space 12 bounded by the inner wall of the inner tube was the designated utilization chamber.

A fuel inlet tube 5 was brazed to the cover plate through each of the 6 fuel inlet holes. Air inlet channels 6 were welded to the cover plate over the 6 air inlet holes. A silicon nitride glow plug 7 (120 watts steady state) was secured with threading to the cover plate through each of the 6 ignition device holes. A reticulated metal screen 13 (McMaster-Carr brand corrosion-resistant 304 stainless steel woven wire cloth, 500×500, opening 0.0012 inch (0.0031 cm), open area 36%, wire diameter 0.0008 inch (0.002 cm)) was positioned in direct contact with the terminus of each fuel inlet tube 5, such that in-coming fuel in the fuel inlet tubes 5 dripped and spread over the surface of the screen 13. Each screen was heated by the glow plug 7 to aid in vaporization and ignition of the fuel.

Downstream and in fluid communication with the mixing region of the burner, the burner was fitted with an annular shaped Microlith® brand metal mesh catalyst substrate coated with a noble metal catalyst (Precision Combustion, Inc., North Haven, Conn.) (FIG. 2(8)). The catalyst consisted of a stack of 10 metal mesh rings, each one 7.9 in (20.1 cm) outer diameter, 6.8 in (17.3 cm) inner diameter, and 0.007 in (0.02 cm) height. Downstream and in fluid communication with the catalyst, the burner was fitted with an annular shaped heat spreader 14, provided as a stack of flat, ring-shaped, stainless steel plates having a series of cuts or incisions on the periphery of each plate. The plates were randomly stacked so as to provide a series of random void spaces through the stack; and the upstream side of the stack directly contacted the downstream side of the catalyst. A heat sink 11 constructed from copper-bonded stainless steel was positioned in the bottom section of the hollow utilization chamber 12, the heat sink positioned in direct contact with the inner tube 2 adjacent to the catalyst 8 and heat spreader 14. The bottom of the heat sink was placed in thermal contact with a copper tubing coil containing a water flow to accommodate heat rejection.

A flow of JP-8 fuel totaling 3,200 Wth was fed through the six fuel inlet tubes 5 at a flow rate for each of 0.75 g/min fuel. Air was fed into the six air inlets 6 at a total rate of 250 l/min, resulting in an individual flow rate of 41.7 l/min air at each fuel inlet tube, for an overall fuel-lean fuel-air equivalence ratio of 0.2:1 to 0.3:1. The glow plugs 7 were energized so as to heat, vaporize, and ignite the fuel in flame mode. At the point at which the temperature of the catalyst 8 reached 400° C., the catalytic combustion lit-off, and the reaction ran both in flame and catalytic flameless modes. Then, the glow plugs 7 were de-energized; and the flame was extinguished and the reaction continued flamelessly at steady state.

Figure 4:
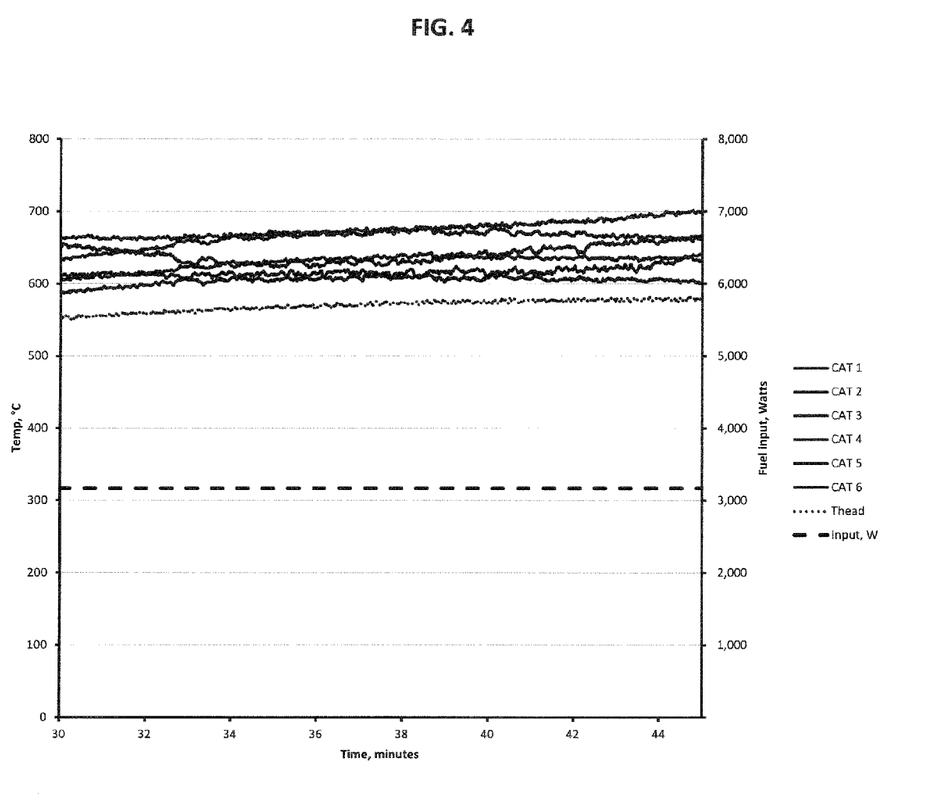
FIG. 4 depicts a plot of catalyst temperature as a function of time in an embodiment of a combustion process of this invention.

Six conventional thermocouples (not shown) were stationed equidistantly and in direct contact with the catalyst to measure temperature during the combustion reaction. A thermocouple was stationed at the head of the heat sink. FIG. 4 presents a graph depicting temperature measurements at the catalyst and the heat sink as a function of time. It is seen that at 30 minutes of operation, the lowest catalyst temperature was 580° C. and the highest temperature was 680° C., with a spread of 100° C. At 45 minutes of operation, the lowest catalyst temperature was 600° C. and the highest catalyst temperature was 700° C., with a spread of 100° C. The fuel input was steady at 3,200 Wth. The temperature of the heat sink was reasonably steady, starting at 550° C. at 30 min and increasing to 580° C. at 45 min. A substantial thermal gradient through the heat sink indicated that heat energy was transferred efficiently radially inwards from the catalyst and the heat spreader and gaseous combustion stream to the heat sink. The combustion product stream and remaining heat of reaction exited the burner to the environment through the burner exhaust outlet 9.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrange-ments not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A catalytic burner comprising:
    (a) a housing comprising an inner tube disposed within an outer tube; wherein a volume in the a region enclosed in between the inner and outer tubes defines a burner chamber, and a volume enclosed within the inner tube defines a utilization chamber;
    (b) a cover plate secured to the housing at an inlet side of the catalytic burner, the cover plate sealing the burner chamber at said inlet side of the catalytic burner;
    (c) a plurality of fuel injectors passing sealingly through the cover plate and terminating in a mixing zone within the burner chamber;
    (d) a plurality of oxidant inlets passing through the cover plate and terminating in the mixing zone within the burner chamber;
    (e) the mixing zone of the burner chamber positioned in fluid communication with the plurality of fuel injectors and the plurality of oxidant inlets;
    (f) at least one ignition device positioned within the mixing zone, each ignition device positioned at a terminus of a the plurality of fuel injectors;
    (g) a combustion catalyst positioned within the burner chamber, downstream and in fluid communication with the mixing zone; and
    (h) an exhaust outlet positioned downstream and in fluid communication with the combustion catalyst.

2. The catalytic burner of claim 1 wherein the combustion catalyst comprises one or more ultra-short-channel-length metal substrates, each having one or more noble metals deposited thereon.

3. The catalytic burner of claim 2 wherein the ultra-short-channel-length metal substrate comprises a metal mesh having a channel length ranging from 25 microns to 500 microns.

4. The catalytic burner of claim 1 further comprising a plurality of heat-conductive reticulated screens, each screen or plurality thereof positioned at the terminus of one of the plurality of fuel injectors.

5. The catalytic burner of claim 4 wherein each of the plurality of heat-conductive reticulated screens comprises a woven metal mesh having wires ranging in diameter from 12.7 µm to 508 µm and having openings (or void spaces) ranging in length, diameter, or longest dimension from 17.8 µm to 508 µm.

6. The catalytic burner of claim 1 wherein the at least one ignition device is employed, the at least one ignition device is selected from the group consisting of glow plugs and spark plugs.

7. The catalytic burner of claim 1 further comprising a heat spreader disposed downstream and in fluid communication with the combustion catalyst and upstream of the exhaust outlet.

8. The catalytic burner of claim 1 wherein a heat sink is secured within the utilization chamber in thermal contact with the combustion catalyst.

9. The catalytic burner of claim 8 wherein the heat sink comprises a heater head of a first Stirling engine, the first Stirling engine being positioned external to the catalytic burner including external to the utilization chamber.

10. The catalytic burner of claim 9 wherein a second Stirling engine is positioned within the utilization chamber; and the second Stirling engine is thermally connected to the heat sink.

11. The catalytic burner of claim 8 wherein auxiliary system components are disposed within the utilization chamber.

12. The catalytic burner of claim 8 wherein a source of solar or geothermal heat is provided to the utilization chamber.

13. The catalytic burner of claim 1 wherein the plurality of fuel injectors comprises from 2 to 24 fuel injectors and wherein the plurality of oxidant inlets is the same as the number of fuel injectors; and wherein the fuel injectors and the oxidant inlets are disposed within the catalytic burner.

14. The catalytic burner of claim 1 further comprising a recuperator positioned adjacent to the catalytic burner.

15. A catalytic burner comprising:
    (a) a housing comprising two rectilinear and coaxial cylindrical tubes such that an outer tube is circumferentially disposed about an inner tube; wherein a volume defined by an annular cross-section circumscribed by the outer and inner tubes defines a burner chamber and a volume defined by space within the inner tube defines a utilization chamber;
    (b) an annular-shaped cover plate secured to the housing at an inlet side of the burner, the cover plate sealing the burner chamber at said inlet side of the catalytic burner;
    (c) a plurality of fuel injectors passing sealingly through the cover plate and terminating in a mixing zone in the burner chamber;
    (d) a plurality of oxidant inlets passing through the cover plate and terminating in the mixing zone in the burner chamber;
    (e) the mixing zone of the burner chamber in fluid communication with the plurality of fuel injectors and the plurality of oxidant inlets;
    (f) at least one glow plug positioned within the mixing zone, each glow plug positioned at a terminus of at least one of each of the plurality of fuel injectors;
    (g) a combustion catalyst in the shape of an annulus define by the inner and outer tubes, the combustion catalyst disposed within the burner chamber downstream and in fluid communication with the mixing zone;

(h) an exhaust outlet positioned downstream and in fluid communication with the combustion catalyst.

16. An external combustion engine having a piston undergoing reciprocating linear motion within an expansion cylinder containing a working fluid, heated by conduction through a heat sink, wherein the improvement comprises employing a catalytic burner for generating heat and transferring heat of combustion to the heat sink, the catalytic burner comprising:

(a) a housing comprising an inner tube disposed within an outer tube; wherein a volume in the region enclosed in between the inner and outer tubes defines a burner chamber, and a volume enclosed within the inner tube defines a utilization chamber;

(b) a cover plate secured to the housing at an inlet side of the catalytic burner, the cover plate sealing the burner chamber at said inlet side of the catalytic burner;

(c) a plurality of fuel injectors passing sealingly through the cover plate and terminating in a mixing zone within the burner chamber;

(d) a plurality of oxidant inlets passing through the cover plate and terminating in the mixing zone within the burner chamber;

(e) the mixing zone of the burner chamber positioned in fluid communication with the plurality of fuel injectors and the plurality of oxidant inlets;

(f) at least one ignition device positioned within the mixing zone, each ignition device positioned at a terminus of at least one of each of the plurality of fuel injectors a fuel injector;

(g) a combustion catalyst positioned within the burner chamber, downstream and in fluid communication with the mixing zone; and (h) an exhaust outlet positioned downstream and in fluid communication with the combustion catalyst.

17. A combustion process wherein a fuel and an oxidant are contacted in the apparatus of claim 1, the contacting occurring in the presence of a combustion catalyst and under process conditions sufficient to produce a product stream comprising carbon dioxide and water.

18. The process of claim 17 wherein the fuel is a liquid fuel selected from gasoline, kerosene, diesel, jet propulsion fuels, and mixtures thereof; or wherein the fuel is a gaseous fuel selected from methane, propane, natural gas, synthesis gas, and mixtures thereof; and wherein the oxidant is selected from essentially pure molecular oxygen, mixtures of oxygen and nitrogen (including air), mixtures of oxygen and inert gases, ozone, and nitrogen oxides.

19. The process of claim 17 wherein a fuel input of greater than 1,000 $W_{th}$ and less than 5,000 $W_{th}$ is employed.

20. The process of claim 17 wherein the process is controlled to maintain a difference between highest and lowest temperatures measured on the combustion catalyst to a value no greater than 100° C.

* * * * *